(No Model.)
E. K. RIGHTER.
CAR WHEEL.
No. 289,142. Patented Nov. 27, 1883.
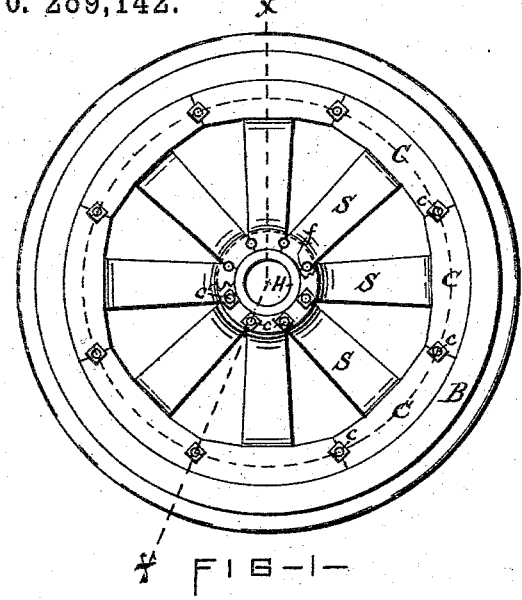
Fig-1-
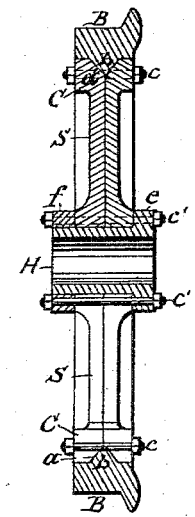
Fig-3-
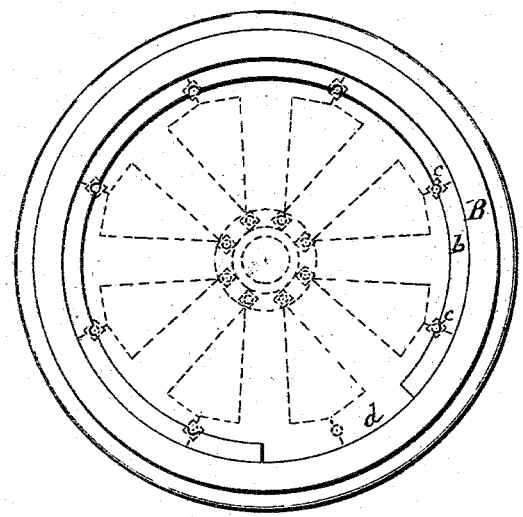
Fig-2-
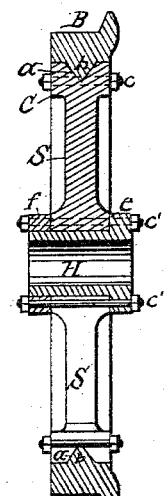
Fig-4-
Witnesses—
Wm C. Raymond
J. H. Gibbs
Inventor—
Edmund K. Righter
per Duell, Laass & Hey
Attys

UNITED STATES PATENT OFFICE.

EDMUND K. RIGHTER, OF OSWEGO, NEW YORK.

CAR-WHEEL.

SPECIFICATION forming part of Letters Patent No. 289,142, dated November 27, 1883.

Application filed August 24, 1883. (No model.)

*To all whom it may concern:*

Be it known that I, EDMUND K. RIGHTER, of Oswego, in the county of Oswego, in the State of New York, have invented new and useful Improvements in Car-Wheels, of which the following, taken in connection with the accompanying drawings, is a full, clear, and exact description.

This invention consists in a wheel the constituent parts of which are so constructed and combined that, while affording the maximum stability with the minimum quantity of material in the wheel, they at the same time admit of readily taking the wheel apart and of repairing or renewing any portion thereof, all as hereinafter more fully explained, and specifically set forth in the claims.

In the annexed drawings, Figure 1 is a face view of my improved wheel. Fig. 2 is a face view of the tire, with the other parts of the wheel indicated by dotted lines. Fig. 3 is a transverse section on line $x\, x$ in Fig. 1, and Fig. 4 is a transverse section illustrating modifications in the detail construction of the wheel.

Similar letters of reference indicate corresponding parts.

H denotes the hub of the wheel, provided on one end with a rigid flange or collar, $e$, and on the opposite end with a removable collar, $f$, fitted to the periphery of the hub and held thereon by bolts $c'\, c'$, passing transversely through the two collars.

S S represent the spokes, the inner ends of which rest on the hub and are mitered or fitted closely side to side, and secured in position by the bolts $c'$ clamping them between the two collars $e\, f$. The outer ends of the spokes terminate in segments C, which are also each mitered or fitted to abut against the ends of the adjacent segments. The outer peripheral face of said segments is provided with one or more longitudinal grooves, $a$, into which fit a corresponding number of ribs, $b$, on the inner periphery of a tire or peripheral ring, B. The described constituent parts of the wheel are thus securely locked together. In order to admit of readily uniting them and as readily separating them when required for repairs or renewal, the rib $b$ is terminated with a blank space, $d$, of sufficient length to receive one of the segments C. Before applying the collar $f$ to the hub H, the several segments are successively introduced in the space $d$, and then shifted around the tire B, with the rib $b$ of the latter engaging the groove $a$ of the segments. After all the segments are thus introduced they are arranged to bring the joints of two of the segments into the center of the length of the space $d$, and thus maintain all the segments in engagement with the rib $b$ of the tire. By means of the bolts $c'\, c'$ drawing the collar $f$ against the inner ends of the spokes, and bolts $c\, c$ passing through the segments at the joints thereof and through the rib $b$, the segments are securely locked in their position.

If desired, the spokes S, with their segments C, may be divided parallel to the plane of the wheel, as illustrated in Fig. 4 of the drawings, in which case the bolts $c\, c$ will necessarily have to be larger in order to hold the said parts united and resist the lateral strain exerted on said parts by the rib $b$ in the groove $a$. Such construction, however, will dispense with the blank space $d$ in the rib $b$, inasmuch as the sections can be applied from opposite sides of the wheel and then secured by the bolts $c$ and $c'$.

Having described my invention, what I claim as new, and desire to secure by Letters Patent, is—

1. In combination with the spokes terminating in segments C, provided with the groove $a$, the tire B, having the rib $b$, and the blank space $d$, adapted to receive one of the segments, and the bolts $c\, c$, passing through the segments and through the rib $b$, substantially as specified and shown.

2. The combination of the hub H, provided with the collar $e$, the removable collar $f$, the spokes S, clamped between said collars and having their outer ends terminating with segments C, provided with the groove $a$, the tire B, provided with the rib $b$ and blank space $d$, bolts $c'$, for fastening the collar $f$, and bolts $c$, passing through the segments and through the rib $b$, all constructed and combined substantially in the manner described and shown.

3. In combination with the tire B, provided with the rib $b$, hub H, provided with collar $e$ and the removable collar $f$, the spokes S, terminating in segments C, provided with the groove $a$, and divided parallel to the plane of the wheel, and bolts $c$ $c'$, for uniting the respective members, substantially in the manner described and shown.

In testimony whereof I have hereunto signed my name and affixed my seal, in the presence of two attesting witnesses, at Oswego city, in the county of Oswego, in the State of New York, this 21st day of August, 1883.

EDMUND K. RIGHTER. [L. S.]

Witnesses:
 F. B. LATHROP,
 CHARLES W. BARNES.